Nov. 2, 1937.   C. I. SHIRK   2,097,536
RETRIEVER FOR FISH LURES
Filed Oct. 31, 1936
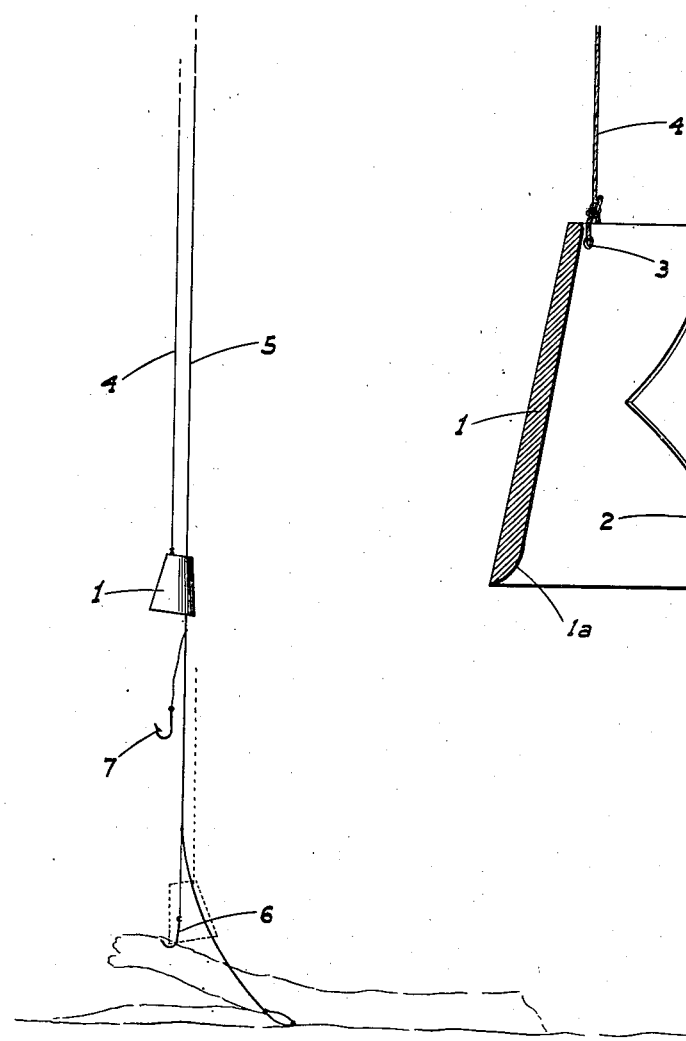
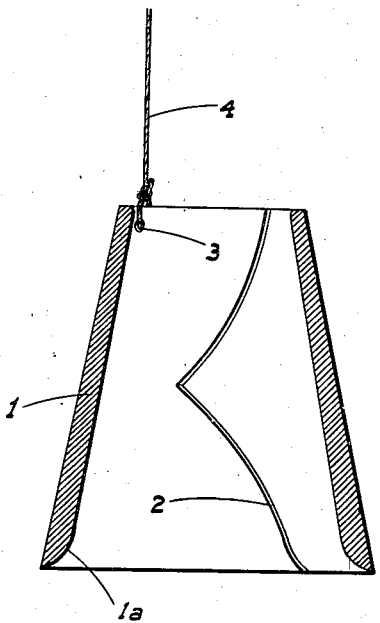
INVENTOR
C. I. Shirk
BY
ATTORNEY Patented Nov. 2, 1937

2,097,536

UNITED STATES PATENT OFFICE 2,097,536

RETRIEVER FOR FISH LURES

Carl I. Shirk, Modesto, Calif.

Application October 31, 1936, Serial No. 108,565

1 Claim. (Cl. 43—30)

This invention relates generally to a retriever for fishing lures which have been "snagged", and in particular, and it is my principal object to provide, a retriever especially designed for recovering fishing lures which have been accidentally caught on a foreign object some distance beneath the surface of the water.

When fishing with bait, hooks and weighted lines, or with underwater trolling lures, commonly known as "plugs", the hooks or lures often become caught on sunken logs and the like in relatively deep water. Such occurrence is not only annoying to the fisherman but many times results in the loss of the fishing tackle due to the fact that the depth of the water prevents recovery thereof.

A further object of the invention is to produce a simple and inexpensive article of manufacture and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views:

Fig. 1 is a diagrammatic elevation illustrating the manner in which my retriever is used to recover a snagged fishing lure.

Fig. 2 is a sectional elevation of my retriever for fishing lures.

Referring now more particularly to the characters of reference on the drawing, the retriever comprises a tubular body 1, preferably of frusto-conical shape and with its bore flaring outwardly at the bottom as at 1a. The body is formed of relatively heavy metal, such as lead or pot metal, and is preferably cast or molded in the desired shape.

The body is provided with a longitudinal slot 2 which extends from end to end of the body. This slot is narrow, being only slightly wider than the diameter of any ordinary fish lure. Said slot is preferably cut so that it extends spirally about the body from one end in one direction for about 45° to a point substantially midway of the length of the body, and then extends in the opposite direction to the other end of the body.

The body, adjacent its top edge, is provided with a hole 3 through which is secured the lower end of a drop line 4. The hole 3 is disposed at a point substantially 90° circumferentially from the adjacent end of the slot for the purpose hereinafter described.

In use, my retriever for fishing lures functions as follows:

The body 1 is first threaded onto the line, indicated at 5, which is attached to the snagged hook or other lure, indicated at 6. This threading operation is accomplished by passing a section of line 5 through the spiral slot 2 in the body of the retriever. As the slot 2 is of spiral configuration, the line 5 cannot accidentally escape from the interior of the body during the retrieving operation.

When the body has been threaded on line 5, that line is drawn relatively taut and the body is lowered down said line by means of drop line 4. If there are any hooks, such as at 7, on line 5 above the snagged hook, the body, by proper manipulation of drop line 4, will pass over said free hook without interference, and since as the body flares from top to bottom, such operation is accomplished with ease.

Upon reaching the snagged hook, a portion of the lower edge of the body will tend to engage between the hook and the object to which the hook is caught. By then raising the body a short distance and permitting it to drop back into such position several times, the body, due to its weight, will soon dislodge the hook.

The fact that the drop line 4 is attached at only one point to the body 1 causes said body to tilt considerably while in use. This tilting assists in retrieving a snagged hook, due to the fact that the lower edge of the body will thus tend to ride the fish line 5 and more readily drop into an effective position to free the snagged hook. This tilting of the body also facilitates the passing of the body over an upper hook 7, since practically the entire bottom area of the body may be disposed by proper manipulation to one side of the line 5 to which said hook is attached.

From the foregoing description it will be readily seen that I have produced such an article of manufacture as substantially fulfills the objects of the invention as set forth herein.

While this specification sets forth in detail the present and preferred construction of the article, still in practice such deviations from such detail may be resorted to as do not form a departure from the spirit of the invention, as defined by the appended claim.

Having thus described my invention, what I claim as new and useful and desire to secure by Letters Patent is:

A retriever for fish lures comprising a tubular body adapted to encircle the line attached to a snagged lure and a drop line secured to said body adjacent the top thereof; the bore of the body being frusto-conical in form.

CARL I. SHIRK.